United States Patent
Zhang et al.

(10) Patent No.: US 9,912,458 B2
(45) Date of Patent: Mar. 6, 2018

(54) PILOT ALLOCATION METHOD BASED ON COHERENCE TIME FOR LARGE-SCALE MIMO SYSTEM

(71) Applicant: SOUTHEAST UNIVERSITY, Nanjing (CN)

(72) Inventors: Hua Zhang, Nanjing (CN); Xinru Zheng, Nanjing (CN); Wei Xu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 15/503,722

(22) PCT Filed: Dec. 29, 2014

(86) PCT No.: PCT/CN2014/095245
§ 371 (c)(1),
(2) Date: Feb. 14, 2017

(87) PCT Pub. No.: WO2016/023321
PCT Pub. Date: Feb. 18, 2016

(65) Prior Publication Data
US 2017/0264410 A1 Sep. 14, 2017

(30) Foreign Application Priority Data
Aug. 15, 2014 (CN) .......................... 2014 1 0404568

(51) Int. Cl.
*H04L 5/00* (2006.01)
*H04B 7/0452* (2017.01)
(Continued)

(52) U.S. Cl.
CPC ......... *H04L 5/0048* (2013.01); *H04B 7/0452* (2013.01); *H04L 25/0222* (2013.01); *H04W 72/048* (2013.01)

(58) Field of Classification Search
CPC ... H04L 5/0048; H04L 5/005; H04L 25/0222; H04L 25/0208; H04L 25/0202;
(Continued)

(56) References Cited

U.S. PATENT DOCUMENTS

2006/0146948 A1* 7/2006 Park ...................... H04L 5/0048
375/260
2011/0019635 A1* 1/2011 Park ...................... H04L 5/0007
370/329

FOREIGN PATENT DOCUMENTS

CN 101022437 A * 8/2007 ............. H04L 27/26
CN 101022437 A 8/2007
(Continued)

*Primary Examiner* — Ian N Moore
*Assistant Examiner* — Brian T Le
(74) *Attorney, Agent, or Firm* — Gokalp Bayramoglu

(57) ABSTRACT

Disclosed is a pilot allocation method based on coherence time for a large-scale multiple input multiple-output (MIMO) system. The present invention achieves optimal allocation of pilot resources by fully utilizing the feature that different users possibly have different moving speeds and coherence time of corresponding channels is accordingly different, thereby improving overall data transmission performance of the system and achieving certain practicability. Moreover, the present invention effectively uses limited transmission resources in the case of limited total transmission resources, thereby improving overall data transmission performance of the system and effectively reducing pilot contamination.

3 Claims, 1 Drawing Sheet

(51) Int. Cl.
*H04L 25/02* (2006.01)
*H04W 72/04* (2009.01)
(58) Field of Classification Search
CPC ........... H04L 25/0204; H04L 25/0206; H04W 72/048; H04W 72/04; H04B 7/0452; H04B 7/0413
See application file for complete search history.

(56) References Cited

FOREIGN PATENT DOCUMENTS

| | | | |
|---|---|---|---|
| CN | 102076097 A | 5/2011 |
| CN | 103716263 A | 4/2014 |
| CN | 103974270 A | 8/2014 |
| CN | 104144039 A | 11/2014 |

* cited by examiner

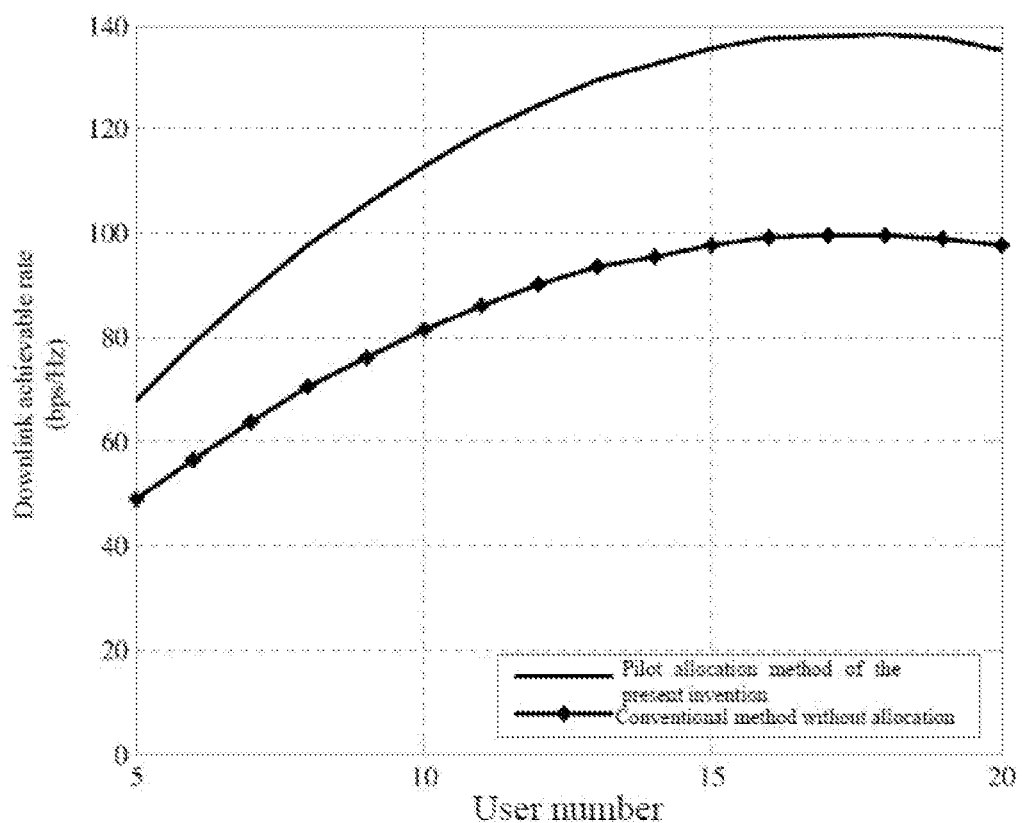

PILOT ALLOCATION METHOD BASED ON COHERENCE TIME FOR LARGE-SCALE MIMO SYSTEM

CROSS REFERENCE TO RELATED APPLICATIONS

This application is the national phase of International Application No. PCT/CN2014/095245, filed on Dec. 29, 2014, which is based upon and claims priority to Chinese Patent Application No. 201410404568.X, filed on Aug. 15, 2014, the entire contents of which are incorporated herein by reference.

TECHNICAL FIELD OF THE INVENTION

The present invention relates to the technical field of wireless communications, and in particular, to a pilot allocation method based on coherence time for a large-scale multiple-input multiple-output (MIMO) system.

BACKGROUND OF THE INVENTION

With the ever-increasing user demand for a high-speed data service and continuous growth in the number of cell users, the mobile communications network has an ever-increasing demand for spectrum resources. Utilization of a system spectrum of a large-scale multiple-user multiple-input multiple-output (MU-MIMO) system is improved by increasing the number of base station antennas, which gains wide attention. Antennas that are far more than users in number are provided at a base station side of the large-scale MIMO system, while the cell users are provided with an individual antenna. By using the numerous antennas, the base station simultaneously serves multiple terminal users in the same time-and-frequency resource, and obtains uplink and downlink channel estimates of all the users by using a pilot transmitted on the uplink and the channel reciprocity of a Time Division Duplex (TDD) system, thereby achieving downlink precoding.

The large-scale MU-MIMO system is essentially characterized in that the number of the antennas at the base station side increases by more than one order of magnitude in comparison with that of the conventional MU-MIMO system. Compared with the conventional MU-MIMO system, it has the following specific advantages: it achieves higher multiples of capacity, higher power utilization, and higher spectrum utilization; may use a relatively cheap and low-power device; and has better link reliability.

For the conventional large-scale MIMO system, all users in a cell use orthogonal pilots, and the base station performs channel estimation by using these orthogonal pilots and the channel reciprocity of the TDD system, thereby obtaining uplink and downlink channel estimation information of all the users. However, due to coherence time and limitation on the number of users, the same orthogonal pilot sequence needs to be reused in multiple cells, so that the base station is interfered by pilot information sent by users in an intra-frequency cell when receiving uplink pilot information, thereby resulting in pilot contamination.

SUMMARY OF THE INVENTION

Technical Problem

In order to overcome defects in the prior art, the present invention provides a pilot allocation method based on coherence time for a large-scale MIMO system, which can achieve optimal allocation of pilot resources, improve overall data transmission performance of the system, and effectively reduce pilot contamination.

Technical Solution

To solve the foregoing technical problems, the present invention provides a pilot allocation method based on coherence time for a large-scale MIMO system, which includes the following steps:

step 1: grouping L cells into $L_f$ cells formed by rapidly moving users and $L_s$ cells formed by slowly moving users, where each cell has K randomly distributed users, each user undergoes independent channel information, the $L_f$ cells form a set $\Gamma_f$, and the $L_s$ cells form a set $\Gamma_s$;

step 2: calculating coherence time of each user at a carrier frequency of the system;

step 3: setting the minimum coherence time length of the users in the set $\Gamma_f$ as a unit coherence time T, where T is a channel estimation interval for all the users in the set $\Gamma_f$, selecting the minimum coherence time length $T_m$ in the set $\Gamma_s$, and setting that $$Q = \left\lfloor \frac{T_m}{T} \right\rfloor,$$

so that QT is a channel estimation interval for all the users in the set $\Gamma_s$, where the number of the unit coherence time is $N_c$;

step 4: estimating, by a base station, channel information of all the users within the first unit coherence time, and performing downlink data transmission according to channel estimates, to obtain a system downlink achievable rate $C_1$;

step 5: determining, within the nth unit coherence time, whether mod(n,Q) is equal to 1 or whether Q is equal to 1, where mod( ) represents a modulo operation; if mod(n,Q)=1 or Q=1, the users in the sets $\Gamma_f$ and $\Gamma_s$ update the channel estimates; or otherwise, the users only in the set $\Gamma_f$ update the channel estimates; and step 6: entering the (n+1)th unit coherence time, and repeating step 5 till the determination within the $N_c$th unit coherence time is done.

Further, a speed of the rapidly moving users in step 1 ranges from 35 km/h to 120 km/h, and a speed of the slowly moving users ranges from 1 km/h to 15 km/h.

Further, the number $N_c$ of the unit coherence time in step 3 is equal to Q.

Advantageous Effect

Compared with the prior art, the present invention achieves optimal allocation of pilot resources by fully utilizing the feature that different users possibly have different moving speeds and coherence time of corresponding channels is accordingly different, thereby improving overall data transmission performance of the system and achieving certain practicability. Moreover, the present invention effectively uses limited transmission resources in the case of limited total transmission resources, thereby improving overall data transmission performance of the system and effectively reducing pilot contamination.

BRIEF DESCRIPTION OF THE DRAWINGS

FIG. 1 shows comparison of downlink achievable rate versus user number between a pilot allocation method of the present invention and a conventional method without allocation.

DETAILED DESCRIPTION OF THE INVENTION

The technical solution of the present invention is further explained below with reference to the accompanying drawings.

The present invention provides a pilot allocation method based on coherence time for a large-scale MIMO system, where the solution includes the following process:

Step 1: There are L cells, each cell has one base station and K users, M represents the total number of antennas of the base station, and $g_{ik}^{j}$ represents a channel vector from the kth user in the ith cell to the base station of the jth cell, where k=1, 2, 3 . . . K, $g_{ik}^{j}=\beta_{ik}^{j}h_{ik}^{j}$, $h_{ik}^{j}$ represents a complex fast fading vector from the kth user terminal in the ith cell to the base station of the jth cell, $h_{ik}^{j}$ remains unchanged within a coherence time length $T_{ik}$, $T_{ik}$ represents channel coherence time of the kth user terminal in the ith cell, and $\beta_{ik}^{j}$ represents a slow fading cofficient from the kth user terminal in the ith cell to the base station of the jth cell. The slow fading coefficient $\beta_{ik}^{j}$ is obtained by using a long-term estimation method.

Step 2: There are $L_f$ cells formed by rapidly moving users and $L_s$ cells formed by slowly moving users in the L cells, the $L_f$ cells form a set $\Gamma_f$ and the $L_s$ cells form a set $\Gamma_s$, where $L_f+L_s=L$, $L_f>1$, and $L_s>1$. A unit coherence time length T is set to $\min\{T_{ik}\}_{i\in\Gamma_f,\forall k}$, where T is a channel estimation interval for all the users in the set $\Gamma_f$. For the cells in $\Gamma_s$, a multiple of $T_m=\min\{T_{ik}\}_{i\in\Gamma_s,\forall k}$ relative to T is calculated and is rounded down, which is recorded as Q, that is, $$Q = \left\lfloor \frac{T_m}{T} \right\rfloor.$$

Then, QT is a channel estimation interval for all the users in $\Gamma_s$. This solution considers that the number of the unit coherence time is $N_c$, and $N_c$ is at least greater than Q.

Step 3: Within the first unit coherence time T, all the users in the L cells first perform uplink pilot transmission simultaneously, and $\rho_k$ is used to indicate average pilot transmit power of the kth user. Then, in a channel estimation phase, a signal received by the base station of the ith cell is as follows:

$$Y_{Bi} = \sum_{j=1}^{L}\sum_{k=1}^{K} \sqrt{\tau\rho_k\beta_{jk}^{i}}\, h_{jk}^{i}\varphi_k + Z \qquad (1)$$

where $\sqrt{\tau}\phi_k$ is a pilot signal of the kth user, $\phi_k$ is a unit orthogonal pilot sequence matrix, τ is a pilot length, τ≥K, it is set herein that τ=K, Z is additive white Gaussian noise, each element of Z conforms to CN (0, 1), $\beta_{jk}^{i}$ represents a slow fading coefficient from the kth user terminal in the jth cell to the base station of the ith cell, and $h_{jk}^{i}$ represents a complex fast fading vector from the kth user terminal in the jth cell to the base station of the ith cell. The following formula may be obtained by minimum mean square error (MMSE) estimation:

$$\hat{h}_{ik}^{i} = \frac{\sqrt{\tau\rho_k\beta_{ik}^{i}}}{1 + \sum_{j=1}^{L}\tau\rho_k\beta_{jk}^{i}}\, Y_{Bi}\varphi_k^{H}. \qquad (2)$$

A channel vector $g_{ik}^{j}$ from the kth user terminal in the ith cell to the base station of the ith cell may be decomposed into $g_{ik}^{j}=\hat{g}_{ik}^{i}+\tilde{g}_{ik}^{i}$, and a channel estimation vector is $\hat{g}_{ik}^{i}=\sqrt{\beta_{ik}^{i}}\hat{h}_{ik}^{i}$, where $\beta_{ik}^{i}$ is a slow fading factor from the kth user terminal in the ith cell to the base station of the ith cell, and $\hat{h}_{ik}^{i}$ is a fast fading estimation vector from the kth user terminal in the ith cell to the base station of the ith cell. According to the nature of MMSE estimation, $\hat{g}_{ik}^{i}\sim$CN (0, $\sigma_{ik}^{2}I_M$) and $\tilde{g}_{ik}^{i}\sim$CN (0, $\epsilon_{ik}^{2}I_M$) are mutually independent channel estimation error vectors, where $I_M$ is an M-dimensional unit matrix, $$\sigma_{ik}^{2} = \frac{\tau\rho_k(\beta_{ik}^{i})^2}{1 + \sum_{j=1}^{L}\tau\rho_k\beta_{jk}^{i}}$$

is a variance of each element of the channel estimation vector, and $\epsilon_{ik}^{2}=\beta_{ik}^{i}-\sigma_{ik}^{2}$ is a variance of each element of the channel estimation error vector.

Step 4: Afterwards, the base station performs downlink data transmission, and then a downlink signal $y_{ik}$ received by the kth user in the ith cell is as follows:

$$y_{ik} = \sum_{j=1}^{L}\sum_{t=1}^{K}\sqrt{P_d}\,(g_{ik}^{j})^H P_{jt} S_{jt} + \upsilon_{ik} \qquad (3)$$

where $s_{jt}$ is a signal to be transmitted to the tth user in the jth cell, and $E[|s_{jt}|^2]=1$. The base station performs, by using channel estimation information, linear precoding on the signal to be transmitted, where $P_{jt}$ is a precoding vector of the tth user in the jth cell, $P_d$ is downlink data power, and $\upsilon_{ik}$ is a unit additive noise. It can be seen from the formula (3) above that, the downlink signal received by the kth user in the ith cell is interfered by downlink data of other users.

Step 5: A downlink achievable rate of the kth user is calculated, and it is set that $a_{ik}^{jt}=(g_{ik}^{j})^H P_{jt}$ and $\alpha_{ik}^{ik}=(g_{ik}^{j})^H P_{ik}$, where $a_{ik}^{jt}$ and $a_{ik}^{jt}$ are temporary variables and have no specific meaning. The formula (3) is rewritten into:

$$y_k = \underbrace{\sqrt{P_d}\,E[a_{ik}^{ik}]S_{ik}}_{signal} + \qquad (4)$$

$$\underbrace{\sqrt{P_d}\,(a_{ik}^{ik} - E[a_{ik}^{ik}])S_{ik} + \sum_{j=1}^{L}\sum_{t=1(j,t)\neq(i,k)}^{K}\sqrt{P_d}\,a_{ik}^{jt}S_{jt}}_{interference} + \underbrace{\upsilon_{ik}}_{noise}$$

where $p_{ik}$ is a precoding vector expression of the kth user in the ith cell.

The formula (4) shows the signal, the interference, and the noise, and thus the downlink achievable rate of the kth user in the ith cell is obtained as follows:

$$R_{ik} = \log_2\left(1 + \frac{P_d E^2[a_{ik}^{ik}]}{P_d \text{var}[a_{ik}^{ik}] + \sum_{j=1}^{L}\sum_{t=1\,(j,t)\neq(i,k)}^{K} P_d E[|a_{ik}^{jt}|^2] + 1}\right) \quad (5)$$

Step 6: A system downlink achievable rate is calculated, and then a precoding vector based on MF is as follows:

$$p_{ik} = \frac{\hat{g}_{ik}^i}{\sqrt{K}\,\|\hat{g}_{ik}^i\|} = \frac{\hat{g}_{ik}^i}{\alpha_{ik}\sqrt{MK}} \quad (6)$$

where $$\alpha_{ik} = \frac{\|\hat{g}_{ik}^i\|}{\sqrt{M}}$$

is a normalization factor, and $$\lim_{M\to\infty} \alpha_{ik}^2 = \lim_{M\to\infty} \frac{(\hat{g}_{ik}^i)^H \hat{g}_{ik}^i}{M} = \sigma_{ik}^2.$$

Therefore, the following formulas are obtained:

$$E[a_{ik}^{ik}] = \frac{1}{\alpha_{ik}\sqrt{MK}} E[(g_{ik}^i)^H \hat{g}_{ik}^i] = \sqrt{\frac{M}{K}}\sigma_{ik} \quad (7)$$

$$\text{var}[a_{ik}^{ik}] = E[|a_{ik}^{ik}|^2] - E^2[a_{ik}^{ik}] = \frac{\beta_{ik}^i}{K} \quad (8)$$

If t≠k, the following formula is obtained:

$$E[|a_{ik}^{jt}|^2] = \frac{1}{\alpha_{jt}^2 MK} E[|(g_{ik}^j)^H \hat{g}_{jt}^j|^2] = \frac{\beta_{ik}^j}{K} \quad (9)$$

If t=k, and j≠i, the following formula is obtained:

$$E[|a_{ik}^{jk}|^2] = \frac{1}{\alpha_{jk}^2 MK} E[|(g_{ik}^j)^H \hat{g}_{jk}^j|^2] = \frac{\beta_{ik}^j}{K} + \frac{M\tau\rho_k(\beta_{ik}^j)^2}{\left(1+\sum_{l=1}^{L}\tau\rho_k\beta_{lk}^j\right)K} \quad (10)$$

Therefore, the downlink achievable rate of the user k in the ith cell is as follows:

$$R_{ik} = \log_2\left(1 + \frac{P_d M\sigma_{ik}^2}{P_d\sum_{j=1}^{L}\beta_{ik}^j + P_d\sum_{j=1,j\neq i}^{L}\frac{M\tau\rho_k(\beta_{ik}^j)^2}{\left(1+\sum_{l=1}^{L}\tau\rho_k\beta_{lk}^j\right)k} + K}\right) \quad (11)$$

Then, when M is infinite, the system downlink achievable rate is as follows:

$$C_1 \lim_{M\to\infty} R_{ik} = \frac{T-K}{T}\sum_{k=1}^{K}\log_2\left(1 + \frac{\sigma_{ik}^2}{\sum_{j=1,j\neq i}^{L}\frac{\tau\rho_k(\beta_{ik}^j)^2}{\left(1+\sum_{l=1}^{L}\tau\rho_k\beta_{lk}^j\right)}}\right) \quad (12)$$

Step 7: Within the nth unit coherence time, it is determined, according to whether mod(n,Q) is equal to 1 or whether Q is equal to 1, whether pilot estimation is needed for the users in $\Gamma_s$, where n≤$N_c$, and mod( ) herein represents a modulo operation. If mod(n,Q)=1 or Q=1, all the users in the L cells are allocated with pilots, that is, the users in $\Gamma_s$ update the channel estimates, and following the process within the first unit coherence time, calculation of the system downlink achievable rate is performed according to Step 3 to Step 6; or otherwise, the users only in $\Gamma_f$ update the channel estimates, that is, it is not required to allocate pilots for the users in $\Gamma_s$ and channel estimation is performed according to Step 3, provided that L in the formulas (1) and (2) is replaced with $L_f$. In calculating the system downlink achievable rate, the process from the formula (3) to the formula (9) is repeated. For calculation using the formula (10), two cases where i∈$\Gamma_f$ and i∈$\Gamma_s$ are taken into consideration:

If $i \in \Gamma_f$, $E[|a_{ik}^{jk}|^2] = \frac{\beta_{ik}^j}{K} + \frac{M\tau\rho_k(\beta_{ik}^j)^2}{\left(1+\sum_{l=1}^{\bar{L}}\tau\rho_k\beta_{lk}^j\right)k}$, where $$\bar{L} = \begin{cases} L_f, & j \in \Gamma_f \\ L, & j \in \Gamma_s \end{cases}.$$

If i∈$\Gamma_s$, and when j∈$\Gamma_s$, $$E[|a_{ik}^{jk}|^2] = \frac{\beta_{ik}^j}{K} + \frac{M\tau\rho_k(\beta_{ik}^j)^2}{\left(1+\sum_{l=1}^{L}\tau\rho_k\beta_{lk}^j\right)K};$$

or otherwise, $$E[|a_{ik}^{jk}|^2] = \frac{\beta_{ik}^j}{K}.$$

Corresponding downlink system achievable rates may be obtained after substitution. After the determination within the nth unit coherence time is done, the process enters next unit coherence time, and Step 7 is repeated to perform the determination, till the determination within the Nth unit coherence time is done.

Step 8: the downlink achievable rates calculated within the Nc unit coherence times are added to obtain a total downlink achievable rate: $C = \sum_{n=1}^{N_c} C_n$.

Simulation Test 1

Parameters in a simulation scenario are as follows: it is set that there are L=4 cells, a cell radius is 500 m, a base station is located in the center of the cell, users are evenly distributed within a cell range that is at least 35 cm away from the base station, and a large-scale fading factor model includes geometric fading with an average fading exponent γ=3.8 dB and log-normally distributed shadow fading with a standard deviation $\sigma_{shadow}$=8 dB, where $L_f$=$L_s$=2, and $L_f$ is corresponding to a set $\Gamma_f$ and $L_s$ is corresponding to a set $\Gamma_s$. A moving speed of users in $\Gamma_f$ ranges from 35 km/h to 120 km/h, and a moving speed of users in $\Gamma_s$ ranges from 1 km/h to 15 km/h. Coherence time of a user having the maximum moving speed is set as unified coherence time T of all the users in $\Gamma_f$, the minimum coherence time length in $\Gamma_s$ is recorded as a unit coherence time $T_m$, and it is set that $$Q = \left\lfloor \frac{T_m}{T} \right\rfloor.$$

Then, unified coherence time of all the users in $\Gamma_s$ is QT. The Monte Carlo method is used in the test, 5000 times of independent distribution of users is randomly generated for simulation, and the simulation result is an average of the 5000 times.

As shown in FIG. 1, comparison of downlink achievable rate versus user number between a pilot allocation method of the present invention and a conventional method without allocation is shown. In FIG. 1, the horizontal coordinate indicates a user number, and the vertical coordinate indicates a downlink achievable rate in bps/Hz. In the FIGURE, a solid line indicates an achievable rate curve for the pilot allocation method of the present invention, and a dotted line indicates an achievable rate curve for the conventional method without allocation. It can be seen from FIG. 1 that, the user number is from 5 to 20 in this simulation scenario, and downlink achievable rates obtained by using the pilot allocation method of the present invention are all higher than those obtained by using the conventional method without allocation. As the user number increases, a performance gain also rises.

Many variations and modifications can be made by those skilled in the art from the forgoing description according to preferred embodiments of the present invention, without departing from the scope of technical concept of the present invention. The technical scope of the present invention is not limited to the content of the specification and should be determined according to the scope of claims.

What is claimed is:

1. A pilot allocation method based on coherence time for a large-scale multiple-input multiple-output (MIMO) system, comprising the following steps:

step 1: grouping L cells into $L_f$ cells formed by a plurality of rapidly moving users and $L_s$ cells formed by a plurality of slowly moving users, wherein each cell has K randomly distributed users, each user undergoes independent channel information, the $L_f$ cells form a set $\Gamma_f$, and the $L_s$ cells form a set $\Gamma_s$;

step 2: calculating coherence time length of each user at a carrier frequency of the system;

step 3: setting a first minimum coherence time length of the users in the set $\Gamma_f$ as a unit coherence time T, wherein T is a channel estimation interval for each of the plurality of users in the set $\Gamma_f$; selecting a second minimum coherence time length $T_m$ of the users in the set $\Gamma_s$, and setting that $$Q = \left\lfloor \frac{T_m}{T} \right\rfloor,$$

so that QT is a channel estimation interval for each of the plurality of slowly moving users in the set $\Gamma_s$, wherein the number of the unit coherence time is $N_c$;

step 4: estimating, by a base station, channel estimation values of all the plurality of rapidly moving and slowly moving users within a first unit coherence time, and performing downlink data transmission according to the channel estimation values, to obtain a system downlink achievable rate $C_1$;

step 5: determining, within an nth unit coherence time, whether mod(n,Q) is equal to 1 or whether Q is equal to 1, wherein mod( ) represents a modulo operation; if mod(n,Q)=1 or Q=1, the plurality of rapidly moving users in the set $\Gamma_f$ and the plurality of slowly moving users in the set $\Gamma_s$ update the channel estimation values; or otherwise, only the plurality of rapidly moving users in the set $\Gamma_f$ update the channel estimation values; and step 6: entering a (n+1)th unit coherence time, and repeating the step 5 till a determination within the $N_c$th unit coherence time is done.

2. The pilot allocation method according to claim 1, wherein a speed of the plurality of rapidly moving users in the step 1 ranges from 35 km/h to 120 km/h, and a speed of the plurality of slowly moving users ranges from 1 km/h to 15 km/h.

3. The pilot allocation method according to claim 1, wherein the number of the unit coherence time $N_c$ in the step 3 is equal to Q.

* * * * *